US008180085B2

(12) United States Patent
Saltykov et al.

(10) Patent No.: US 8,180,085 B2
(45) Date of Patent: May 15, 2012

(54) ASSEMBLY PROCEDURE FOR CIC WITH FLOATING COMPONENTS

(75) Inventors: Oleg Saltykov, Fairlawn, NJ (US); Fred McBagonluri, East Windsor, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 1264 days.

(21) Appl. No.: 11/845,138

(22) Filed: Aug. 27, 2007

(65) Prior Publication Data

US 2009/0060242 A1 Mar. 5, 2009

(51) Int. Cl.
*H04R 25/00* (2006.01)
*B29C 45/14* (2006.01)

(52) U.S. Cl. .... 381/324; 381/322; 381/328; 264/272.15

(58) Field of Classification Search .................. 381/322, 381/324, 328; 600/25; 264/222, 272.15, 264/275, 279, 279.1
See application file for complete search history.

(56) References Cited

U.S. PATENT DOCUMENTS

| | | | |
|---|---|---|---|
| 7,054,457 | B2 | 5/2006 | Saltykov |
| 2002/0198437 | A1 | 12/2002 | Juneau et al. |
| 2004/0264723 | A1 | 12/2004 | Saltykov |

FOREIGN PATENT DOCUMENTS

| | | |
|---|---|---|
| WO | 02/03757 | 1/2002 |
| WO | 2004/078064 | 9/2004 |

OTHER PUBLICATIONS

European Search Report of Application No. 08162185.6 dated Jun. 26, 2010.

*Primary Examiner* — Lincoln Donovan
*Assistant Examiner* — Andrew R Millikin
(74) *Attorney, Agent, or Firm* — Francis G. Montgomery

(57) ABSTRACT

A method and appertaining assembly are provided for CIC hearing aid manufacture for the placement of floating components. A hearing aid shell fixture is formed that comprises an interior region identical in shape and size to an interior region of an actual hearing aid shell, and a replica of one or more shell components that is positioned so as to replicate a position and size of one or more real shell components in the actual hearing aid shell. The hearing aid shell fixture is placed onto a faceplate assembly that comprises a floating component, and a position of the floating component is adjusted to avoid contact with the replica of one or more shell components. The hearing aid shell fixture on the faceplate is subsequently replaced with the actual hearing aid shell.

16 Claims, 9 Drawing Sheets

ASSEMBLY PROCEDURE FOR CIC WITH FLOATING COMPONENTS

BACKGROUND

The present invention relates to the field of hearing aid manufacturing and specifically relates to an assembly procedure for a completely-in-canal (CIC) design with floating components.

A custom hearing aid with a stereolithography (SLA) shell that includes a holding fixture for the receiver assembly has been described in prior art publications, such as U.S. Pat. No. 7,054,457 and U.S. patent publication no. 2004/0264723A1, both herein incorporated by reference. In these references, the process of shell manufacturing includes a virtual assembly that uses special 3-D design software. The operator of the 3-D software places all of the virtual components of the hearing aid into the virtual shell on a display of the computer system, therefore assuring the necessary space between the virtual components. Once the design is complete, the 3-D software produces an STL file that is used by an SLA machine to produce the physical shell. The STL file is a standard file format that is native to the stereolithography CAD software created by 3D Systems, and supported by many other software packages. Stereolithography utilizes a computer controlled UV laser beam to harden a photocurable liquid resin to produce 3-D copies of CAD models. The SLA computer may utilize the STL file format.

It is essential for the normal operation of a hearing aid that the receiver does not collide with any other components, otherwise feedback will occur and the hearing aid performance will suffer.

A typical construction of a CIC instrument includes floating components that do not have a rigidly fixed position, but rather are held in place by the flexible wires that connect them to the fixed components. The assembler of the hearing aid positions such components in order to fit them into the various shapes and sizes of CIC shells. The use of the floating components enables the assembler to close very small CIC instruments by placing the floating component into the available space inside the shell.

The main disadvantage of the floating components is that the operator does not have a clear guide for placing them. Even if the floating components are placed correctly during the virtual assembly, the operator can not put them precisely into the designated places. Therefore, floating components may collide with the receiver and cause the hearing aid to malfunction.

The prior does not address the problem of a possible collision of the receiver with floating components.

SUMMARY

In order to provide for a better assembly of hearing aids involving floating components that avoids collision problem described above, an assembly and appertaining method are provided. According to an assembly embodiment of the invention, a hearing aid shell fixture is provided, comprising: a shell assembly that comprises an interior region identical in shape and size to an interior region of an actual hearing aid shell, the shell assembly comprising an access mechanism permitting access to an interior region of the shell assembly; and a receiver replica mounted in the shell assembly that is of a size and is positioned so as to replicate a real receiver in the actual hearing aid shell. The hearing aid shell fixture may comprise detachable posts that are located at bottom corner regions of the shell fixture, the posts comprising an outside surface that correspondingly match to an inside surface of the actual hearing aid shell. In this configuration, breakable bars may be provided that temporarily hold the detachable posts in place. Removable shell fixture portions may be provided that generally cover the detachable posts. The shell fixture access mechanism may be formed as a side opening of the shell that permits access to a hybrid of a temporarily joined faceplate.

In another embodiment, a hearing aid assembly kit may be provided that comprises the above-described shell fixture in addition to the other components necessary to assemble the hearing aid, including: a hearing aid shell; a hearing aid faceplate designed to be affixed to the hearing aid shell; and a floating hybrid designed to be affixed to the faceplate.

According to a corresponding embodiment of an inventive method for assembling a hearing aid, the method comprises: forming a hearing aid shell fixture that comprises an interior region identical in shape and size to an interior region of an actual hearing aid shell, and a replica of one or more shell components that is positioned so as to replicate a position and size of one or more real shell components in the actual hearing aid shell; placing the hearing aid shell fixture onto a faceplate assembly that comprises a floating component; adjusting a position of the floating component to avoid contact with the replica of one or more shell components; and replacing the hearing aid shell fixture on the faceplate with the actual hearing aid shell.

As described in more detail herein, the replica of one or more shell components is a receiver replica; and the floating component is a floating hybrid. Adjusting a position of the floating hybrid comprises accessing the hybrid through a hole in a side of the shell fixture. The method may further comprise forming detachable posts that are located at bottom corner regions of the shell fixture, the posts comprising an outside surface that correspondingly match to an inside surface of the actual hearing aid shell. These may be permanently affixed to the faceplate when the shell fixture is placed on the faceplate assembly, and then detached from the shell fixture. These posts are then used as accurate positioning guides for placing the actual hearing aid shell on the faceplate. Removable cover portions on the shell fixture can be provided over the detachable posts. Finally, breakable bars that hold the detachable posts to the shell fixture can be broken in order to detach them from the shell fixture.

DESCRIPTION OF THE DRAWINGS

The invention is describe by various preferred embodiments illustrated in the drawings below and following descriptive text.

DETAILED DESCRIPTION OF THE PREFERRED EMBODIMENTS

Figure 1:
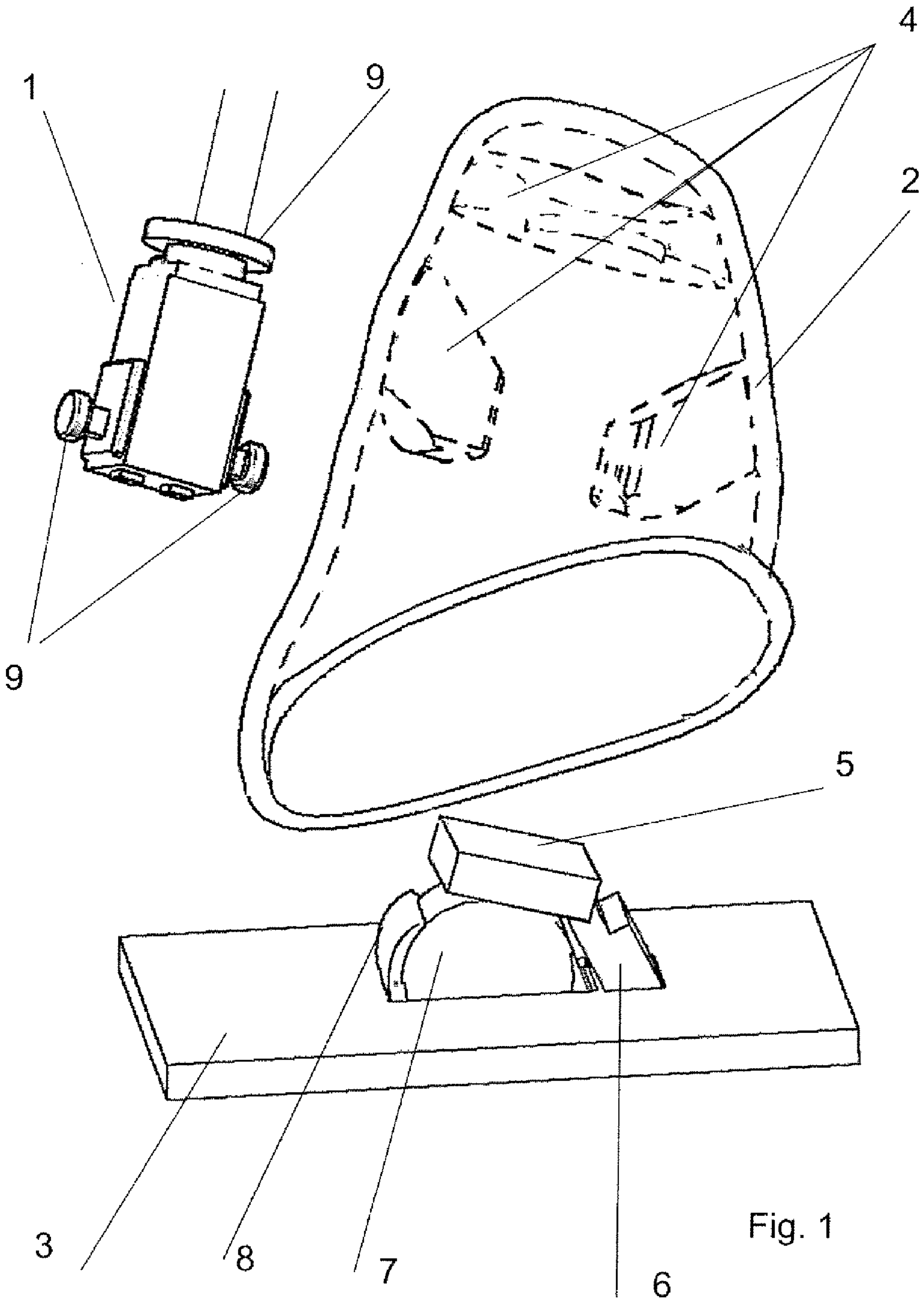
FIG. 1 is a pictorial illustration of a CIC hearing aid component having floating components in a generally unassembled state.

FIG. 1 illustrates a CIC hearing aid component having floating components. A receiver 1 with suspension elements 9 for holding it are placed into the shell 2 having receiver supports 4. A faceplate 3 of the hearing aid includes a battery 7, a battery door 8, a microphone 6 and a floating hybrid amplifier 5 (otherwise termed herein as hybrid 5). If the hybrid 5 is not positioned correctly, it may collide with the receiver 1 after the face plate 3 has been attached to the shell 2.

Figure 2:
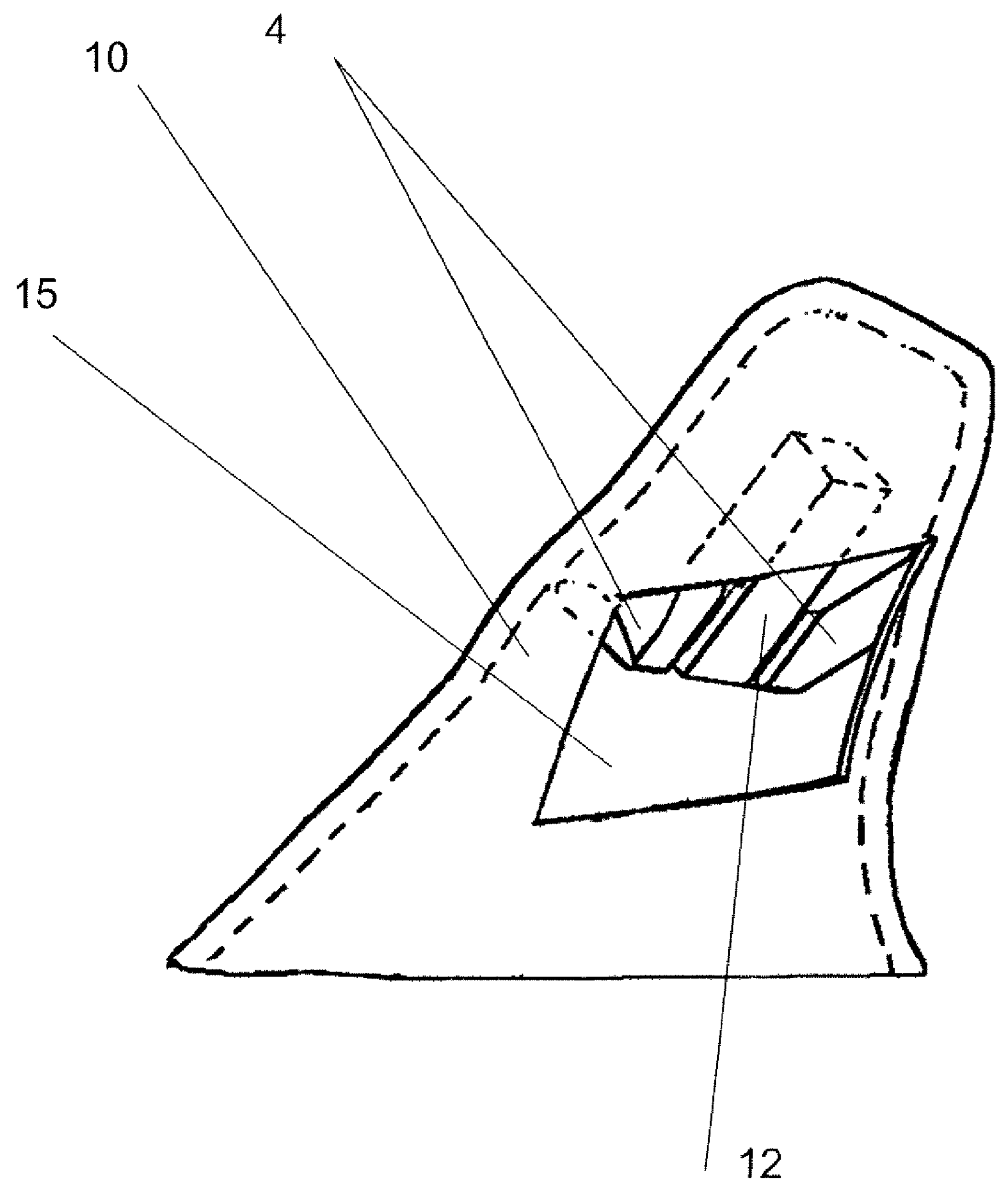
FIG. 2 is a pictorial illustration showing the use of a special shell fixture.

The inventive assembly procedure eliminates the collisions of floating components with the receiver in CIC instruments. In order to achieve a collision-free assembly, FIG. 2 illustrates how a special shell fixture 10 is manufactured in addition to the shell 2, and is based on the known characteristics of the shell 2. The shell fixture 10 is identical to the shell 2 with the following exceptions: a) the space for the receiver in the real shell 2 is filled (in the shell fixture 10) with a receiver replica 12 that simulates the space to be taken up in the real shell 2; and b) an opening 15 for access is made on a side wall of the shell fixture 10. It should be noted that the receiver replica 12 is an inoperative element that is present solely to replicate the space that will be taken up with the actual receiver in the real shell 2. This could include any number of fixed components that will ultimately reside in the shell.

Figure 3:
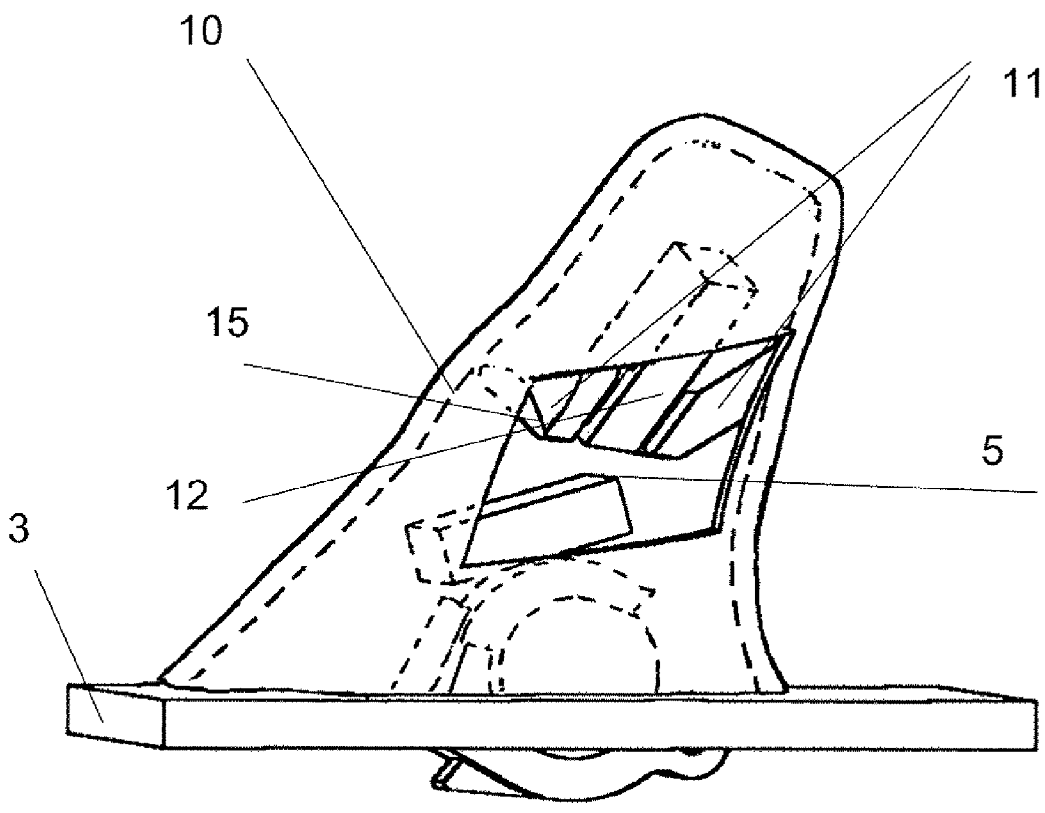
FIG. 3 is a pictorial illustration showing the insertion of the faceplate into the shell fixture.
Figure 8:
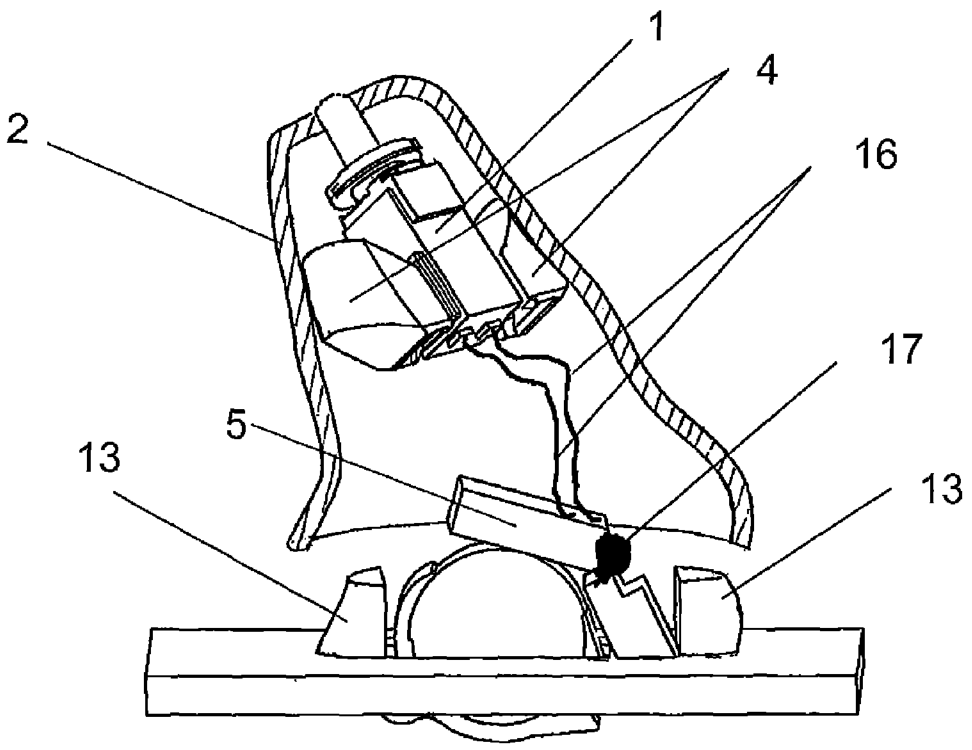
FIG. 8 is a pictorial illustration showing the assembly with Litz wires inserted into the shell.

The assembly procedure is conducted as follows: a) as illustrated in FIG. 3, the components of the faceplate 3 are inserted into the shell fixture 10 (which serves the purpose of being a temporary positioning guide); b) the assembler reaches the hybrid 5 via the recess/opening 15 in the shell fixture 10 and positions the hybrid 5 at a proper distance from the receiver replica 12; c) the shell fixture 10 is removed from the faceplate 3, and the hybrid 5 may be affixed on the structure associated with the faceplate 3; d) the receiver 1 with Litz wires 16 is inserted into the shell 2 (see FIG. 8); e) the Litz wires 16 are soldered to the hybrid 5; and f) the shell 2 is attached to the faceplate 3; and g) posts 13 may then be used as guides (see FIG. 9) in a procedure described below.

Figure 4:
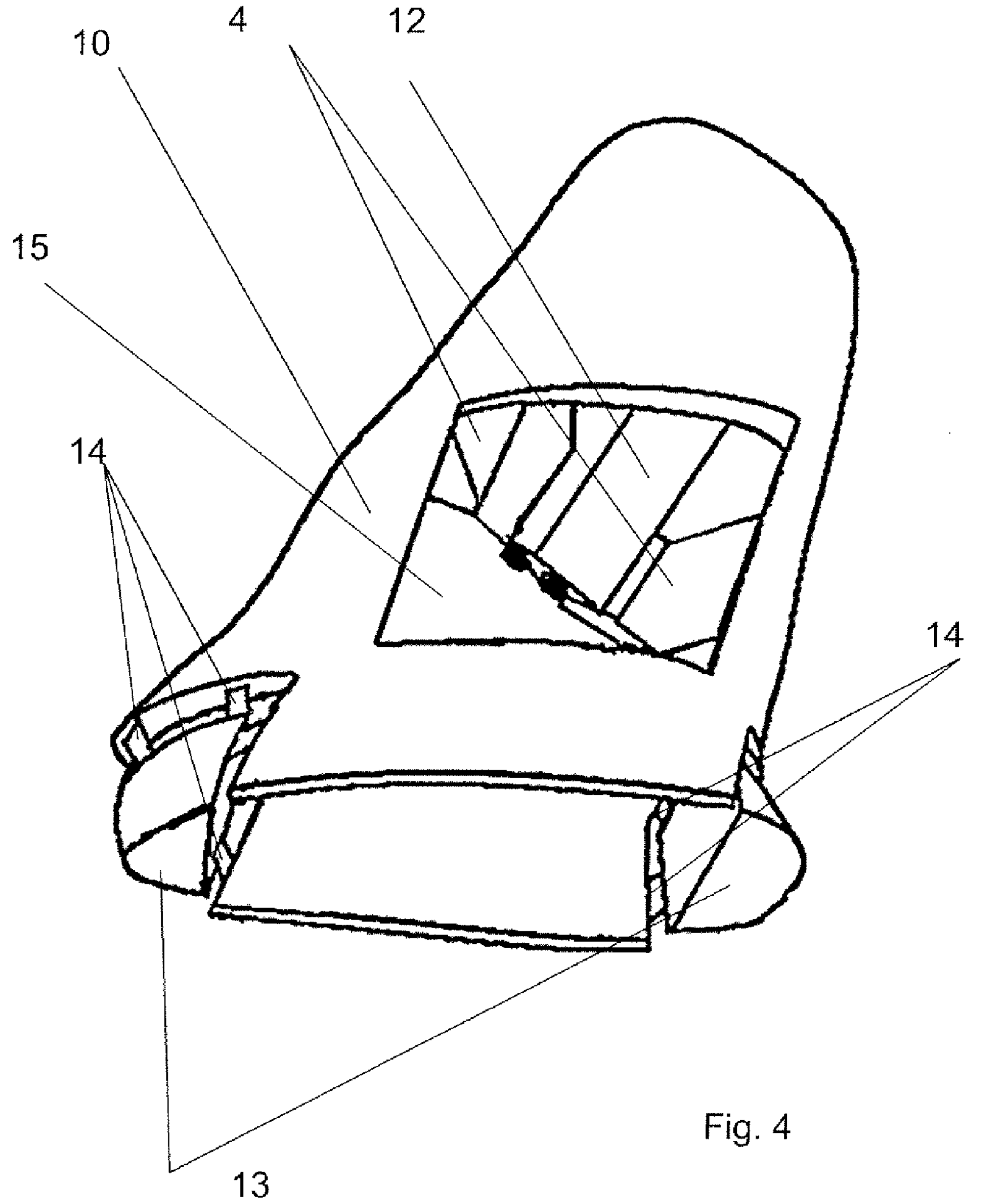
FIG. 4 is a pictorial illustration showing an embodiment with two posts at the bottom corners of the shell.

If space permits placing guiding posts 13 on the faceplate, the assembly procedure can be further improved. The shell fixture 10 in this scenario can further include (referring to FIG. 4): a) two posts 13 at bottom corners of the shell fixture 10—the outside surfaces of the posts 13 match a corresponding inside surface of the shell 2; b) the bottom corners of the shell fixture 10 are removable from around the two posts 13 permitting an uncovering of them; and c) the two posts 13 are connected to the shell fixture 10 with bars 14 designed to detach the posts 13 from the shelf fixture 10.

Figure 5:
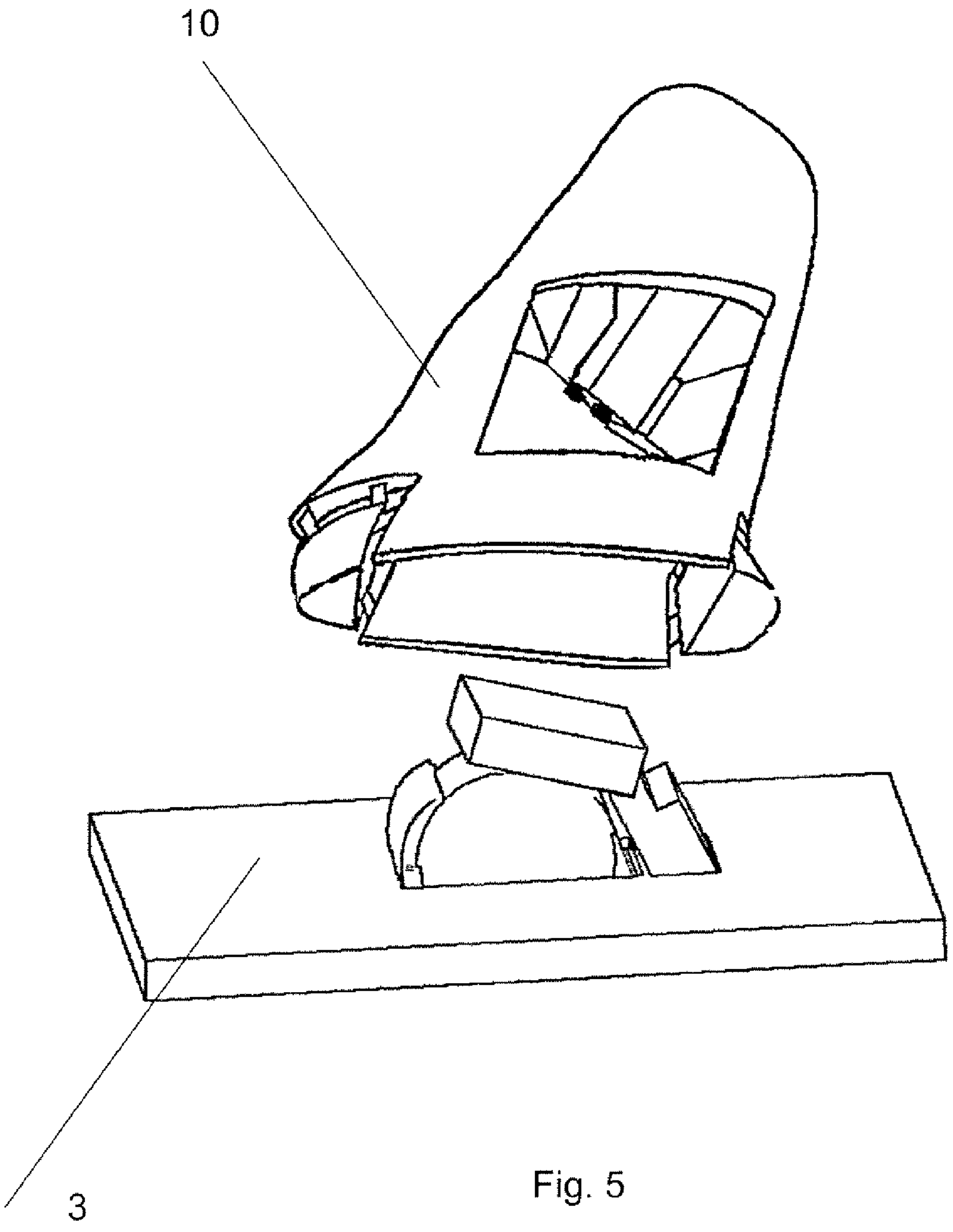
FIG. 5 is a pictorial illustration showing the insertion of the faceplate into the shell fixture shown in FIG. 4.
Figure 6:
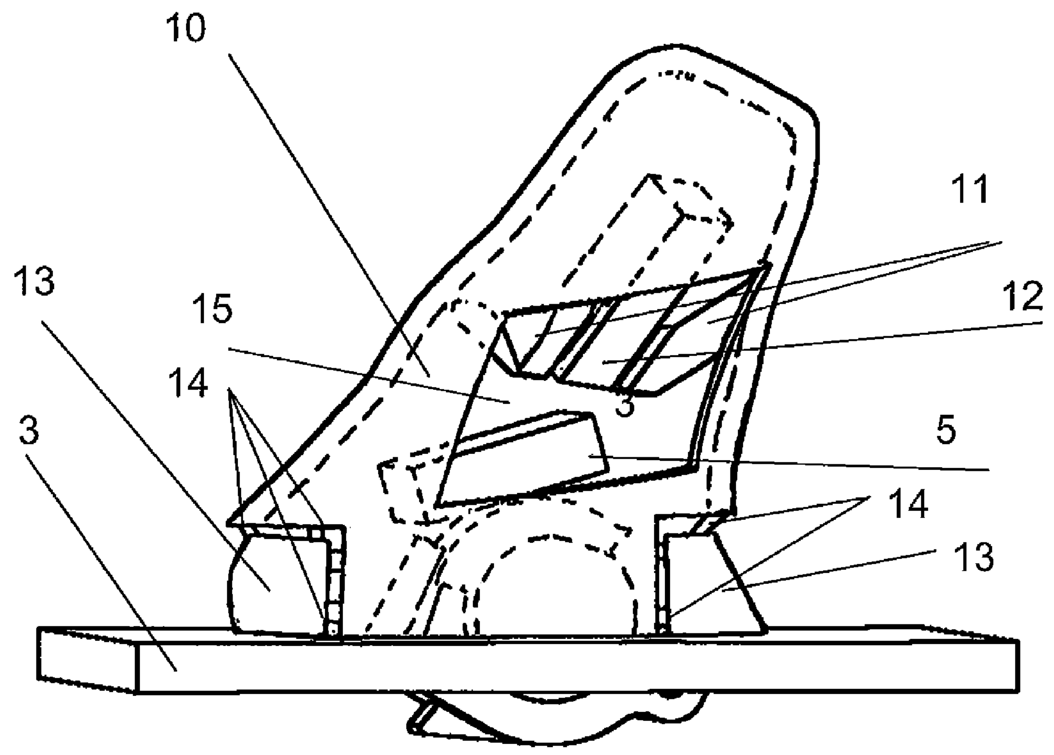
FIG. 6 is a pictorial illustration showing the assembled faceplate and shell.
Figure 7:
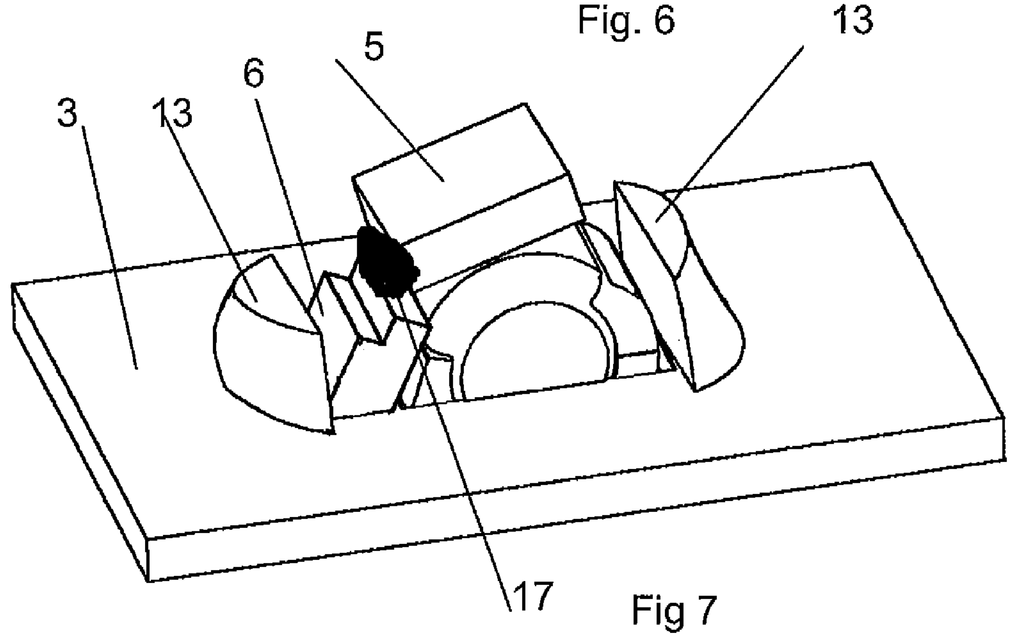
FIG. 7 is a pictorial illustration showing the faceplate with glued hybrid.
Figure 9:
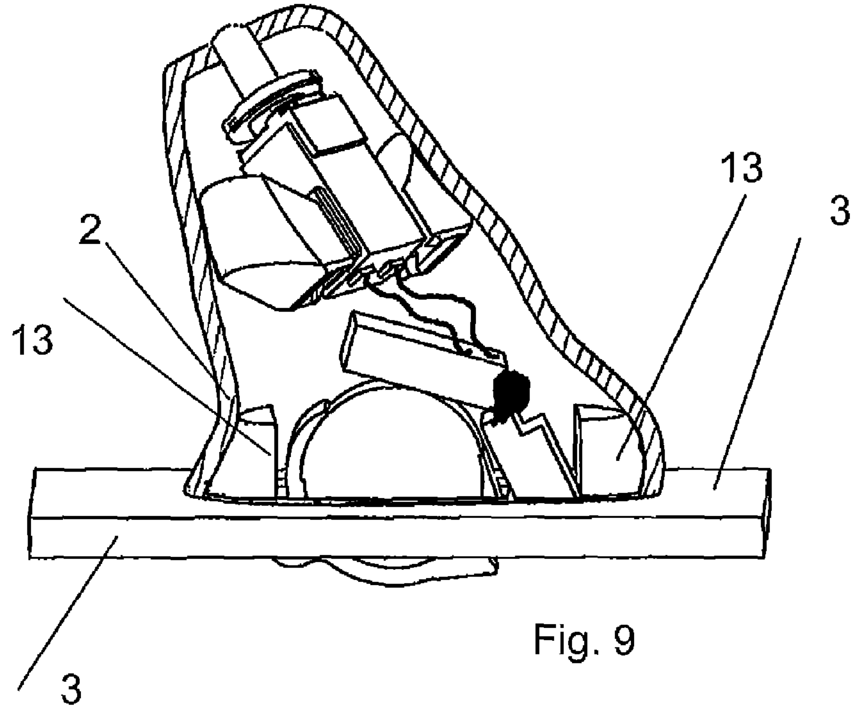
FIG. 9 is a pictorial illustration showing the fully assembled hearing aid.

When guide posts 13 are used, the assembly procedure utilizing the guiding posts 13 is conducted (similarly, as described above) as follows: a) the components of the faceplate 3 are inserted into the shell fixture 10 (see FIGS. 5, 6); b) the posts 13 are glued to the faceplate 3 (FIG. 6); c) the hearing aid assembler reaches the hybrid 5 via the recess 15 in the shell fixture 10 and positions the hybrid 5 at a proper distance from the receiver replica 12 and receiver support replicas 11; d) as can be seen in FIG. 7, the hybrid 5 may then be glued to one of the fixed components with an attaching compound 17; e) the shell fixture 10 is removed by breaking the bars 14; the receiver 1 with Litz wires 16 is inserted into the shell 2 (see FIG. 8); the Litz wires 16 are soldered to the hybrid 5; and finally, f) the shell 2 is attached to the faceplate 3, with the posts 13 being used as the guides (FIG. 9). In this way, a proper alignment and spacing is realized, even when using floating components.

Figure 11:
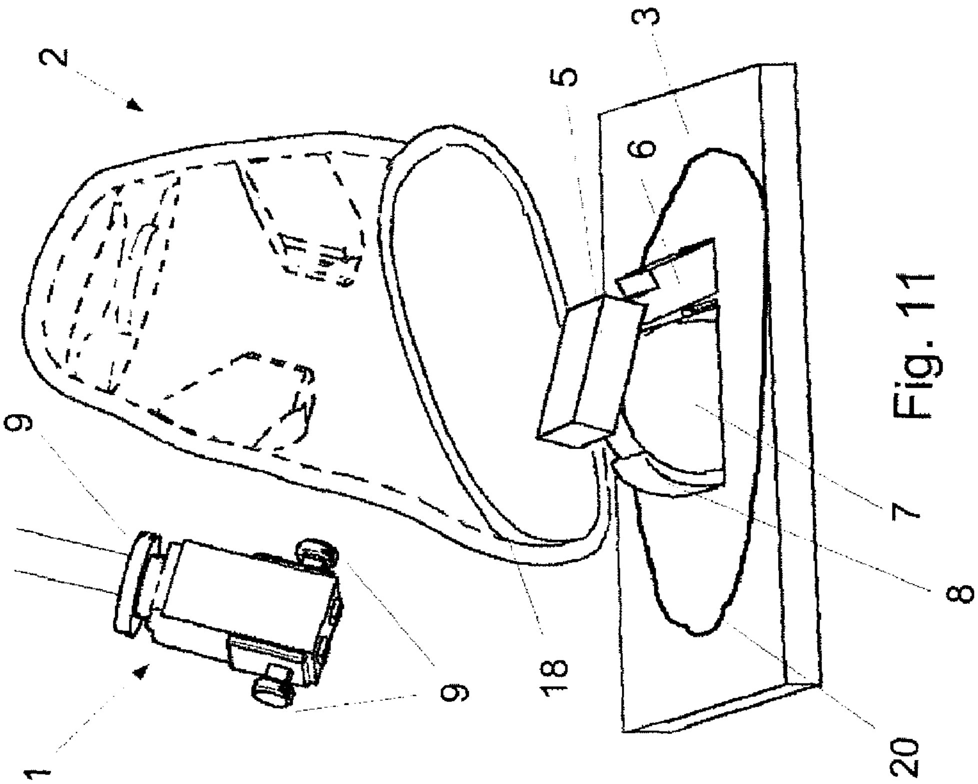
FIG. 11 is a pictorial illustration showing the shell and receiver assembly according to the embodiment illustrated in FIG. 10.
Figure 10:
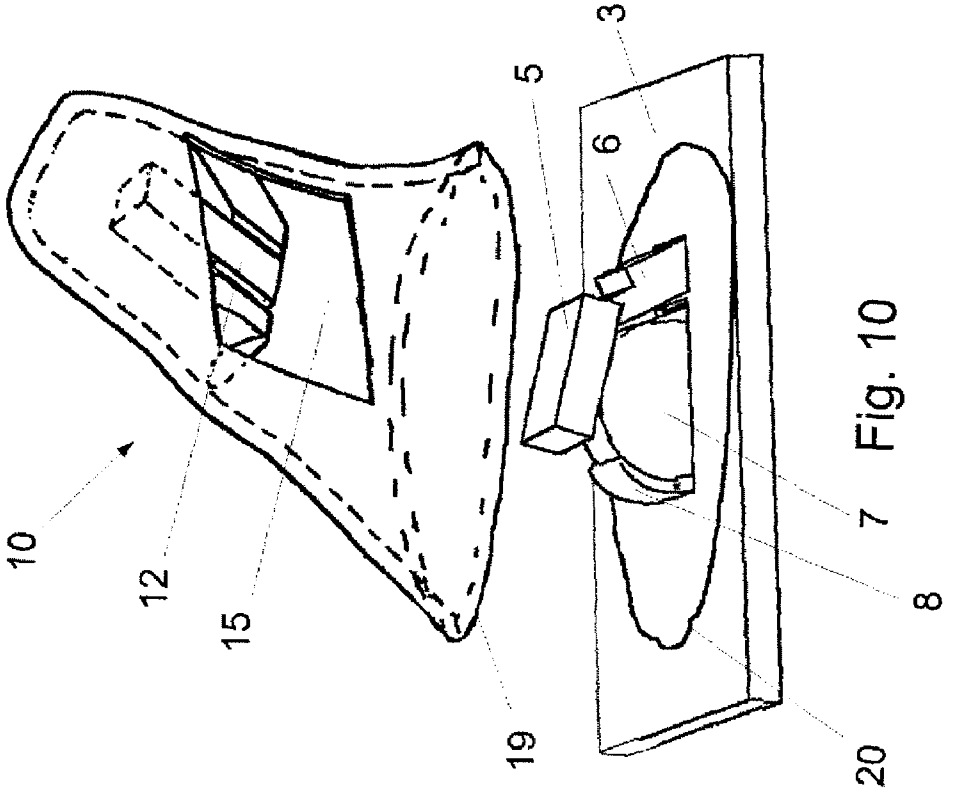
FIG. 10 is a pictorial illustration according to a further embodiment in which a placement mark is placed around the shell fixture.
Figure 12:
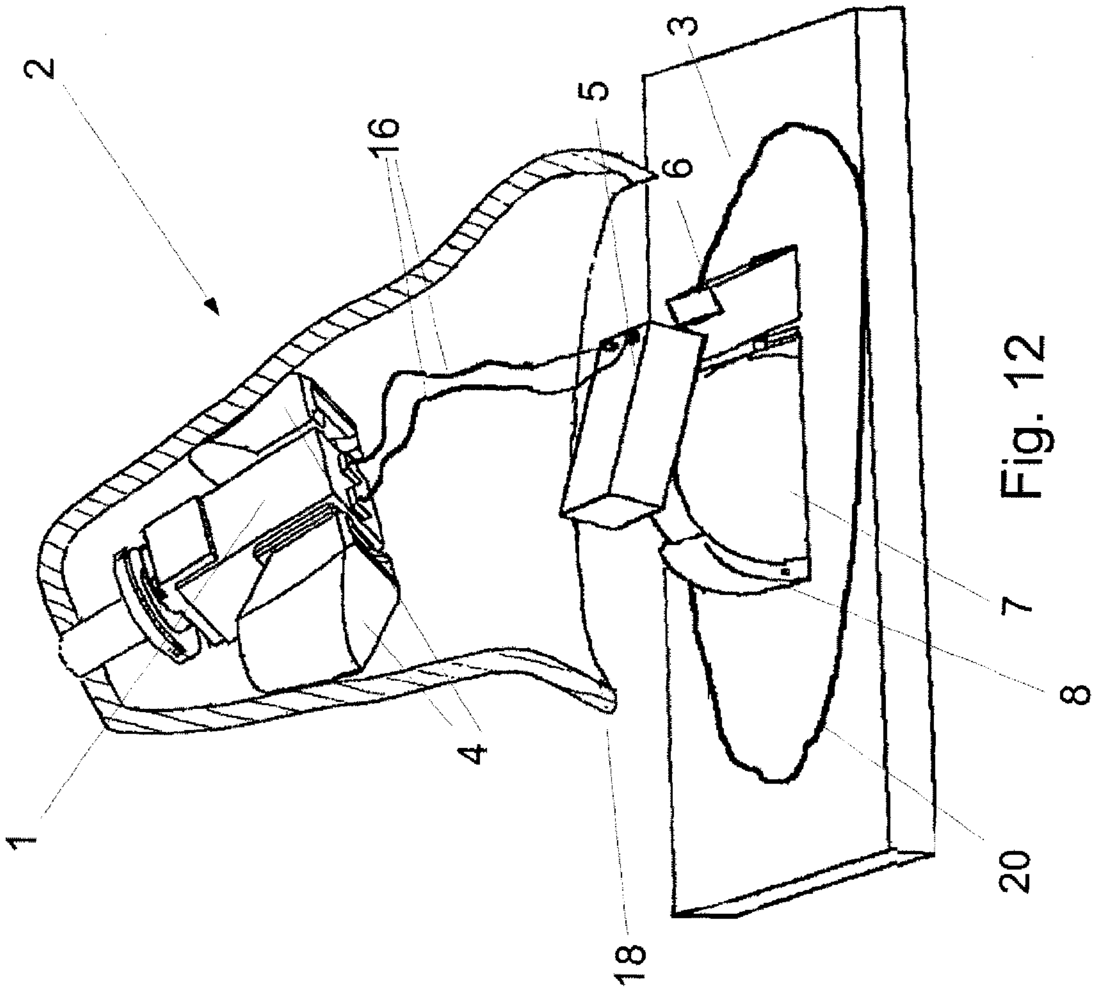
FIG. 12 is a pictorial illustration showing placement of the fully assembled shell to the faceplate according to the embodiment illustrated in FIG. 12.

FIGS. 10-12 illustrate an alternate embodiment that does not use guide posts 13 for accurate placement, but instead uses a placement mark 20. This embodiment could be utilized in a low-cost configuration. According to this embodiment, the shell fixture 10 is placed on the faceplate 3 and a placement mark 20 is created around the outside of the shell fixture 10. This placement mark 20 could be in the form of a pen or pencil marking, or it could be an etching or scribing, or any form of indicator as to where the outside shell fixture edge 19 resides. The positioning adjustments are then made, as described above, and the final shell 2 placement is made, as illustrated in FIG. 12, where the shell edge 18 is located on the faceplate 3 so that it falls within the boundaries of the placement mark 20 and then the shell 2 is affixed to the faceplate 3.

The invention has been illustrated according to the above described preferred embodiments. However the invention is to be construed broadly so that it encompasses the placement of any floating (or other) component, and so that such components avoid collision with other components associated with the shell.

No limitation of the scope of the invention is intended by the specific language used to describe the embodiments, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional electronics and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

TABLE OF REFERENCE CHARACTERS

1 receiver
2 shell
3 faceplate
4 receiver supports
5 floating hybrid
6 microphone
7 battery

8 battery door
9 receiver suspension elements
10 shell fixture
11 receiver support replicas
12 receiver replica
13 posts
14 bars
15 shell opening
16 wires
17 attaching compound
18 shell edge
19 shell fixture edge
20 placement mark

What is claimed is:

1. A hearing aid shell fixture, comprising:

a shell assembly that comprises an interior region identical in shape and size to an interior region of an actual hearing aid shell, the shell assembly comprising an access mechanism permitting access to an interior region of the shell assembly;

a receiver replica mounted in the shell assembly that is of a size and is positioned so as to replicate a real receiver in the actual hearing aid shell; and detachable posts that are located at bottom corner regions of the shell assembly, the posts comprising an outside surface that correspondingly match to an inside surface of the actual hearing aid shell.

2. The hearing aid shell fixture according to claim 1 further comprising breakable bars that temporarily hold the detachable posts in place.

3. The hearing aid shell fixture according to claim 1, further comprising removable shell fixture portions that generally cover the detachable posts.

4. A hearing aid shell fixture, comprising:

a shell assembly that comprises an interior region identical in shape and size to an interior region of an actual hearing aid shell, the shell assembly comprising an access mechanism permitting access to an interior region of the shell assembly; and a receiver replica mounted in the shell assembly that is of a size and is positioned so as to replicate a real receiver in the actual hearing aid shell, wherein the access mechanism comprises a side opening of the shell assembly that permits access to a hybrid amplifier of a temporarily joined faceplate.

5. A hearing aid assembly kit, comprising:

a hearing aid shell;

a hearing aid faceplate designed to be affixed to the hearing aid shell;

a floating hybrid amplifier designed to be affixed to the faceplate; and a hearing aid shell fixture that aids in placing the floating hybrid amplifier during assembly, said fixture comprising a shell assembly that comprises an interior region identical in shape and size to an interior region of an actual hearing aid shell, the shell assembly comprising an access mechanism permitting access to an interior region of the shell assembly; and a receiver replica mounted in the shell assembly that is of a size and is positioned so as to replicate a real receiver in the actual hearing aid shell.

6. The hearing aid assembly kit according to claim 5, the hearing aid shell fixture further comprising:

detachable posts that are located at bottom corner regions of the shell fixture, the posts comprising an outside surface that correspondingly match to an inside surface of the actual hearing aid shell.

7. The hearing aid assembly kit according to claim 6, the hearing aid shell fixture further comprising breakable bars that temporarily hold the detachable posts in place.

8. The hearing aid assembly kit according to claim 6, the hearing aid shell fixture further comprising removable shell fixture portions that generally cover the detachable posts.

9. The hearing aid assembly kit according to claim 5, the hearing aid shell fixture further comprising a side opening of the shell assembly that permits access to a hybrid amplifier of a temporarily joined faceplate.

10. A method for assembling a hearing aid comprising:

forming a hearing aid shell fixture that comprises an interior region identical in shape and size to an interior region of an actual hearing aid shell, and a replica of one or more shell components that is positioned so as to replicate a position and size of one or more real shell components in the actual hearing aid shell;

placing the hearing aid shell fixture onto a faceplate assembly that comprises a floating component;

adjusting a position of the floating component to avoid contact with the replica of one or more shell components; and replacing the hearing aid shell fixture on the faceplate with the actual hearing aid shell, the replica of one or more shell components is a receiver replica; and the floating component is a floating hybrid amplifier.

11. The method for assembling the hearing aid according to claim 10, wherein adjusting a position of the floating hybrid amplifier comprises accessing the hybrid amplifier through a hole in a side of the shell fixture.

12. The method for assembling the hearing aid according to claim 10, further comprising:

forming detachable posts that are located at bottom corner regions of the shell fixture, the posts comprising an outside surface that correspondingly match to an inside surface of the actual hearing aid shell;

permanently affixing the detachable posts to the faceplate when the shell fixture is placed on the faceplate assembly;

detaching the detachable posts from the shell fixture; and using the affixed detachable posts as positioning guides for placing the actual hearing aid shell on the faceplate.

13. The method for assembling the hearing aid according to claim 12, further comprising:

removing cover portions of the shell fixture to expose the detachable posts prior to detaching them.

14. The method for assembling the hearing aid according to claim 12, further comprising:

breaking breakable bars that hold the detachable posts to the shell fixture in order to detach them from the shell fixture.

15. The method according to claim 10, further comprising:

inserting the receiver with wires into the actual hearing aid shell; and soldering the wires to the hybrid amplifier, prior to attaching the actual hearing aid shell to the faceplate.

16. The method according to claim 10, further comprising:

prior to replacing the hearing aid shell fixture, marking an outer edge of the shell fixture on the faceplate, wherein replacing the hearing aid shell fixture comprises aligning the hearing aid shell to lie within the marking.

* * * * *